(12) United States Patent
Nakahara et al.

(10) Patent No.: US 11,822,481 B2
(45) Date of Patent: Nov. 21, 2023

(54) SEMICONDUCTOR DEVICE AND METHOD FOR CONTROLLING SEMICONDUCTOR DEVICE

(71) Applicant: FUJITSU LIMITED, Kawasaki (JP)

(72) Inventors: Shiho Nakahara, Nerima (JP); Takahide Yoshikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/862,433

(22) Filed: Jul. 12, 2022

(65) Prior Publication Data

US 2023/0143732 A1    May 11, 2023

(30) Foreign Application Priority Data

Nov. 8, 2021    (JP) .................................. 2021-181669

(51) Int. Cl.
*G06F 12/0891*    (2016.01)
*G06F 12/0871*    (2016.01)
*G06F 12/0804*    (2016.01)

(52) U.S. Cl.
CPC ...... *G06F 12/0891* (2013.01); *G06F 12/0804* (2013.01); *G06F 12/0871* (2013.01)

(58) Field of Classification Search
CPC ............. G06F 12/0891; G06F 12/0804; G06F 12/0871
See application file for complete search history.

(56) References Cited

U.S. PATENT DOCUMENTS

| | | | | |
|---|---|---|---|---|
| 9,043,530 | B1 * | 5/2015 | Sundaram | G06F 3/0656 |
| | | | | 711/158 |
| 9,946,646 | B2 * | 4/2018 | Walker | G06F 1/3206 |
| 10,133,678 | B2 * | 11/2018 | Eckert | G06F 12/126 |
| 2008/0109593 | A1 * | 5/2008 | Karamcheti | G06F 12/08 |
| | | | | 711/E12.078 |
| 2011/0002163 | A1 | 1/2011 | Fukami et al. | |
| 2011/0145501 | A1 * | 6/2011 | Steely, Jr. | G06F 12/12 |
| | | | | 711/E12.024 |
| 2019/0286367 | A1 | 9/2019 | Shirota et al. | |

FOREIGN PATENT DOCUMENTS

| | | |
|---|---|---|
| JP | 2010-250511 A | 11/2010 |
| JP | 2019-164508 A | 9/2019 |
| WO | 2009/110532 A1 | 9/2009 |

* cited by examiner

*Primary Examiner* — Prasith Thammavong
(74) *Attorney, Agent, or Firm* — Fujitsu Patent Center

(57) ABSTRACT

A semiconductor device includes: a first cache that includes a first memory and rewrite flags that indicate whether rewriting has been performed for each piece of data held in the first memory; and a second cache that includes a second memory and a third memory that has a lower writing speed than the second memory, stores data evicted from the first cache in the second memory when a rewrite flag corresponding to the evicted data indicates a rewrite state, and stores data evicted from the first cache in the third memory when a rewrite flag corresponding to the evicted data indicates a non-rewrite state.

7 Claims, 12 Drawing Sheets

FIG. 6

| SET | US (SRAM) | WAY0 | | | WAY1 | | | US (MRAM) | WAY0 | | | WAY1 | | |
|---|---|---|---|---|---|---|---|---|---|---|---|---|---|---|
| | | V | ... | DT | V | ... | DT | | V | ... | DT | V | ... | DT |
| 00 | 0 | 1 | ... | 0x... | 1 | ... | 0x... | 1 | 0 | ... | 0x... | 1 | ... | 0x... |
| 01 | 1 | 0 | ... | 0x... | 1 | ... | 0x... | 1 | 1 | ... | 0x... | 1 | ... | 0x... |
| 10 | ... | ... | ... | ... | ... | ... | ... | ... | ... | ... | ... | ... | ... | ... |
| 11 | ... | ... | ... | ... | ... | ... | ... | ... | ... | ... | ... | ... | ... | ... |

SRAM ARRAY 420

MRAM ARRAY 430

400

SEMICONDUCTOR DEVICE AND METHOD FOR CONTROLLING SEMICONDUCTOR DEVICE

CROSS-REFERENCE TO RELATED APPLICATION

This application is based upon and claims the benefit of priority of the prior Japanese Patent Application No. 2021-181669, filed on Nov. 8, 2021, the entire contents of which are incorporated herein by reference.

FIELD

The embodiments discussed herein are related to a semiconductor device and a method for controlling the semiconductor device.

BACKGROUND

A cache installed in a semiconductor device such as a central processing unit (CPU) holds a part of data stored in an external memory. When the cache holds the target data of a read access request issued from an arithmetic core (cache hit), the cache transfers the data held in the cache to the arithmetic core without issuing the read access request to the external memory. Accordingly, data access efficiency is improved, and processing performance of an arithmetic processing unit improves. For example, a semiconductor device in which a cache is installed has an architecture that improves the efficiency of data transfer.

Japanese Laid-open Patent Publication No. 2010-250511, International Publication Pamphlet No. WO 2009/110532, and Japanese Laid-open Patent Publication No. 2019-164508 are disclosed as related art.

SUMMARY

According to an aspect of the embodiments, a semiconductor device includes: a first cache that includes a first memory and rewrite flags that indicate whether rewriting has been performed for each piece of data held in the first memory; and a second cache that includes a second memory and a third memory that has a lower writing speed than the second memory, stores data evicted from the first cache in the second memory when a rewrite flag corresponding to the evicted data indicates a rewrite state, and stores data evicted from the first cache in the third memory when a rewrite flag corresponding to the evicted data indicates a non-rewrite state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of an SRAM array and an MRAM array of an L2 cache in FIG. 4;

DESCRIPTION OF EMBODIMENTS

Although the processing performance of an arithmetic processing unit improves as the capacity of a cache increases, the capacity of a cache installable in an arithmetic processing unit is limited. Accordingly, there has been proposed a method of increasing a cache capacity by storing a tag in a static random-access memory (SRAM) that is normally used as a cache and storing data in a dynamic random-access memory (DRAM). There has been proposed a method of using a magnetoresistive random-access memory (MRAM) operating at a high speed as a cache and an MRAM operating at a low speed as a main storage device in a semiconductor device in which different types of MRAMs are installed.

An information processing apparatus has been known that includes an arithmetic processing unit including a cache, a volatile memory and a nonvolatile memory each storing data and the like used in the arithmetic processing unit, and a management device for managing access to the volatile memory and the nonvolatile memory. In this type of information processing apparatus, the management device executes wear leveling of accessing the volatile memory instead of a page of the nonvolatile memory in which the number of times of writing exceeds a set value.

For example, in a case where a cache includes two types of memories with different writing speeds, it is preferable that data with a high rewrite frequency be stored in a memory having a high writing speed so as not to reduce the access efficiency. Also, it is preferable that the rewrite frequency be known before the memory into which data is written is determined, and it is preferable that the amount of information indicating the rewrite frequency be small in order to suppress an increase in the circuit size.

According to one aspect, an object of the present disclosure is to improve the access efficiency of a cache including a plurality of memories with different writing speeds while suppressing an increase in the circuit size.

Hereinafter, embodiments will be described with reference to the drawings.

Figure 1:
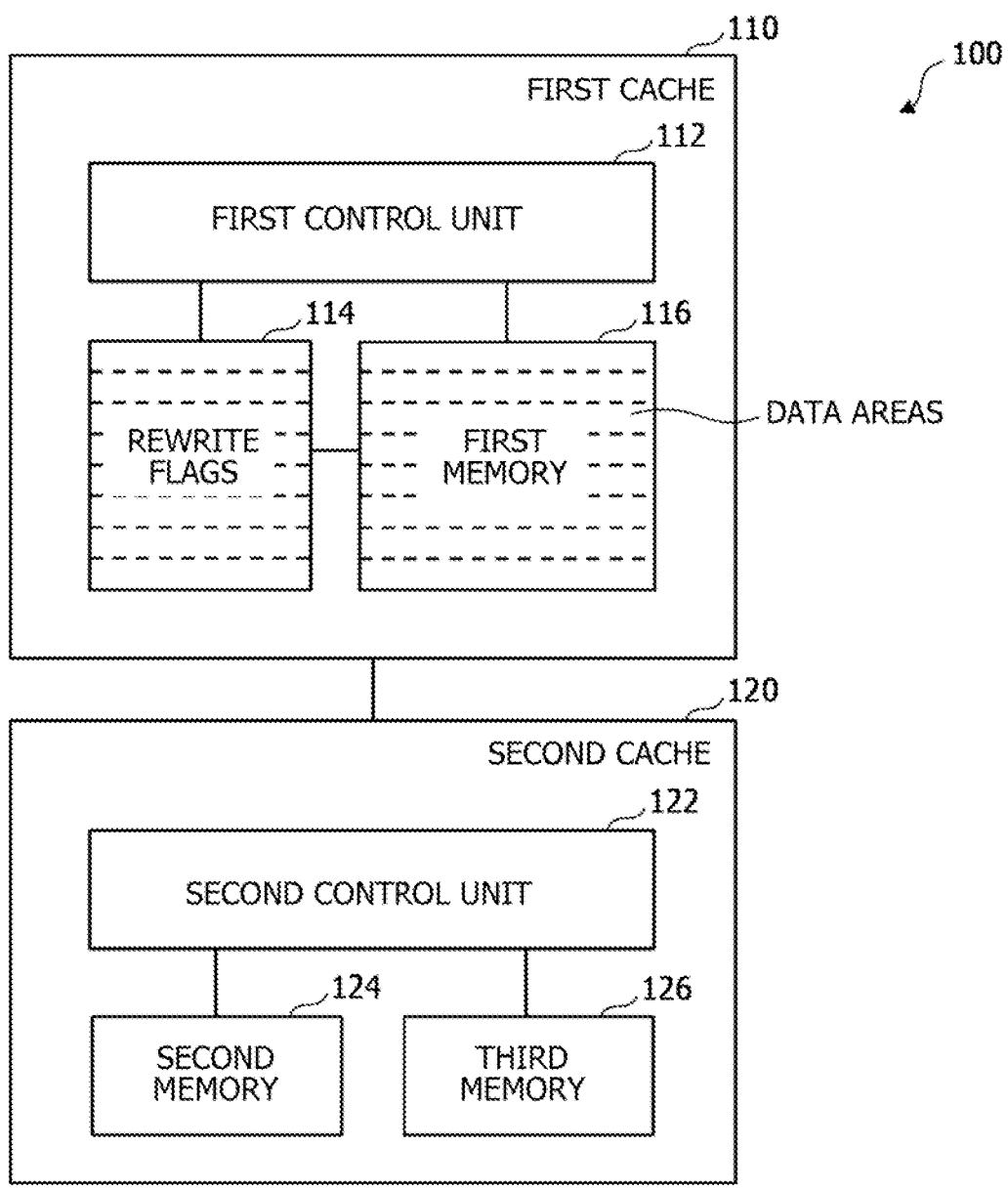
FIG. 1 is a block diagram illustrating an example of a semiconductor device according to an embodiment.

FIG. 1 illustrates an example of a semiconductor device according to an embodiment. For example, a semiconductor device 100 illustrated in FIG. 1 is a processor such as a CPU. The semiconductor device 100 includes a first cache 110 and a second cache 120 disposed as a subordinate cache of the first cache 110. For example, the semiconductor device 100 includes an arithmetic unit (not illustrated) connected to the first cache 110 and configured to issue access requests (a write request and a read request) to the first cache 110. The arithmetic unit is an example of a controller.

For example, the first cache 110 and the second cache 120 may be an L1 cache and an L2 cache, respectively, or may be an L2 cache and an L3 cache, respectively. The second cache is connected to a subordinate cache or a main memory (not illustrated).

For example, the semiconductor device 100 has an architecture of an exclusion cache (victim cache) in which data stored in the first cache 110 and data stored in the second cache 120 do not overlap each other. For this reason, for example, data read from the main memory based on a read request from the arithmetic unit is directly stored in the first cache 110. Data evicted from the first cache 110 is stored in the second cache 120.

The first cache 110 may be installed in a CPU chip together with the arithmetic unit (not illustrated), and the second cache may be installed in a dedicated chip. In this case, the semiconductor device 100 may be realized by stacking the CPU chip and the dedicated chip on each other.

The first cache 110 includes a first control unit 112, rewrite flags 114, and a first memory 116. The first memory 116 includes a plurality of data areas for holding data. The first control unit 112 controls setting of the rewrite flags 114 and input and output of data to and from the first memory 116. The rewrite flags 114 are provided respectively correspondingly to the data areas of the first memory 116, and hold information indicating whether data held in the data area has been rewritten. For example, a rewrite flag is one bit, and logical value 1 indicates that rewriting has been performed and logical value 0 indicates that rewriting has not been performed.

FIG. 1 illustrates an example in which the first memory 116 includes eight data areas, and the rewrite flags 114 respectively corresponding to the eight data areas are provided. However, the number of data areas is not limited to eight, and may be two to the power of n (n is an integer of one or larger). The size of each data area (cache line size) is set to an integral multiple of the number of bits of data used in an arithmetic element installed in the semiconductor device 100, and is, for example, 8 bytes to 256 bytes.

When storing data transferred from the main memory in a data area of the first memory 116, the first control unit 112 sets the rewrite flag 114 corresponding to the data area in which the data is stored to a non-rewrite state. When data held in a data area is rewritten based on a write request from the arithmetic unit, the first control unit 112 sets the rewrite flag 114 corresponding to the data area in which data is to be rewritten to a rewrite state.

The rewrite flag 114 in a rewrite state indicates that the rewrite frequency of data is high, and the rewrite flag 114 in a non-rewrite state indicates that the rewrite frequency of data is low. As described above, the rewrite frequency is represented by one bit for each piece of data. Since the amount of information on the rewrite flags 114 indicating the rewrite frequency may be reduced, the circuit size (chip size) of the semiconductor device 100 may be reduced as compared with a case where the rewrite frequency is indicated by more than one bit (such as the number of times of rewriting).

For example, in a case where the rewrite flags 114 are provided, a set/reset circuit for the rewrite flags 114 is provided in the first cache 110, and a determination circuit for the rewrite flags 114 is provided in the second cache 120.

Accordingly, an increase in the circuit size may be minimized. By contrast, in a case where the rewrite frequency is represented by the number of times of rewriting, a counter and a control circuit that controls the counter are provided in the first cache 110, and a comparison circuit that compares the counter values is provided in the second cache 120. Accordingly, the circuit size increases as compared with the case where the rewrite flags 114 are provided.

In a case where the chip size is determined in advance, the storage capacity (the number of data areas) of the first memory 116 may be increased as compared with the case where the counter and the like are provided. As a result, cache hit ratio of the first cache 110 may be improved, and data access efficiency may be improved.

The first control unit 112 sets the rewrite flag 114 to a rewrite state at a time point when data held in the first memory 116 is rewritten. Since a rewrite history of data is determined before data is evicted to the second cache 120, a second control unit 122 may store the data in either one of a second memory 124 and a third memory 126 in accordance with the rewrite history.

By contrast, a case is conceivable in which statistics of the rewrite frequency of data stored in the second memory 124 and the third memory 126 are acquired, and it is determined in which of the second memory 124 and the third memory 126 data is to be stored based on the acquired statistics. In this case, it may not be determined whether it is appropriate to store the data in the second memory 124 or to store the data in the third memory 126, until the statistics are acquired.

In a case where the first cache 110 is an L1 cache, data stays in the L1 cache for a shorter time than in a subordinate cache such as an L2 cache, and the number of times of rewriting for each piece of data in the first cache 110 is smaller than the number of times of rewriting in the subordinate cache. For this reason, in a case where the rewrite frequency is monitored in the first cache 110, the rewrite frequency may be accurately represented by the rewrite flag 114 of one bit without using a counter.

The second cache 120 includes the second control unit 122, the second memory 124, and the third memory 126. The data writing speed of the second memory 124 is higher than the data writing speed of the third memory 126. The data reading speed of the second memory 124 may be higher than the data reading speed of the third memory 126.

When data is evicted from the first cache 110, the second control unit 122 stores the evicted data in either one of the second memory 124 and the third memory 126. For example, when the rewrite flag 114 corresponding to the evicted data indicates a rewrite state, the second control unit 122 stores the evicted data in the second memory 124. When the rewrite flag 114 corresponding to the data evicted from the first cache 110 indicates a non-rewrite state, the second control unit 122 stores the evicted data in the third memory 126.

Accordingly, data with a high rewrite frequency may be written to the second memory 124 having a high writing speed, and data with a low rewrite frequency may be written to the third memory 126 having a low writing speed. By writing data with a high rewrite frequency to the second memory 124, an average value of time taken to rewrite data in the second cache 120 may be lowered, and thus the access efficiency of the second cache 120 may be improved. Since the second control unit 122 has only to determine the bit value of the rewrite flag 114, it may be easily determined in which of the second memory 124 and the third memory 126 data is to be stored, as compared with a case where the magnitude relation of the counter values indicating the number of times of rewriting is determined.

Figure 2:
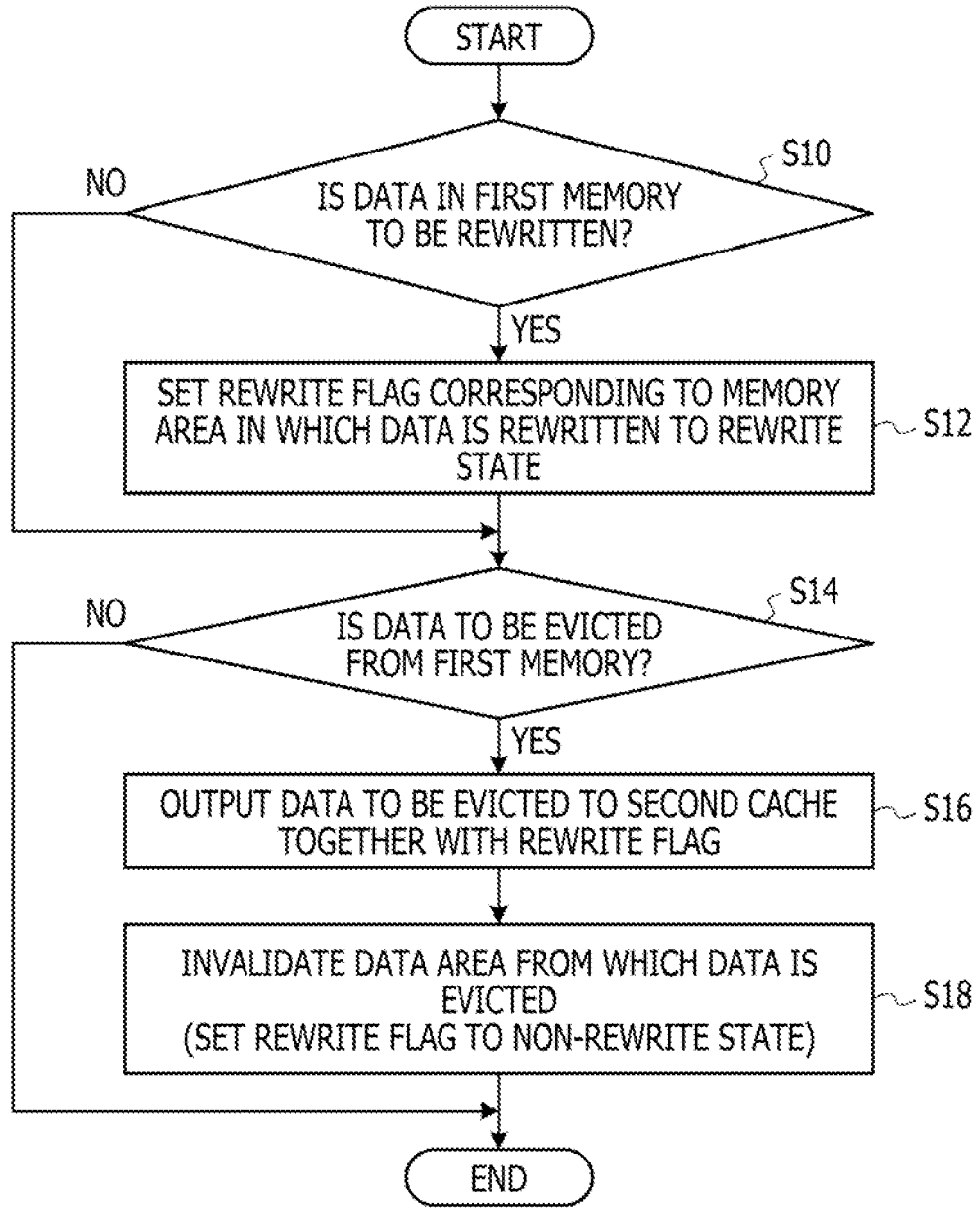
FIG. 2 is a flow diagram illustrating an example of the operation of a first cache in FIG. 1.

FIG. 2 illustrates an example of the operation of the first cache 110 in FIG. 1. For example, the flow illustrated in FIG. 2 may be executed at the time of rewriting or evicting of data held in the first memory 116, or may be executed at a predetermined frequency. Data is stored in the first memory 116 before the start of the flow illustrated in FIG. 2.

First, in step S10, the first control unit 112 determines whether to rewrite the data held in the first memory 116. When rewriting the data, the first control unit 112 executes step S12. When not rewriting the data, the first control unit 112 proceeds to step S14.

For example, rewriting of data is executed when a write request is issued from the arithmetic unit, using data included in the write request. Rewriting of data is also executed when a cache hit occurs in the first cache 110 in response to a write request, and is also executed when a cache miss occurs. When a cache miss occurs, rewriting of data is executed after data transferred from a subordinate cache or the main memory is stored in the first memory 116.

In step S12, the first control unit 112 sets the rewrite flag 114 corresponding to the data area in which the data is rewritten to a rewrite state. As described above, the first control unit 112 may monitor the rewrite frequency of data by setting the rewrite flag 114 to a rewrite state based on reception of a write request from the arithmetic unit. After step S12, the first control unit 112 executes step S14.

In step S14, the first control unit 112 determines whether to evict data from the first memory 116. When evicting data, the first control unit 112 executes step S16. When not evicting data, the first control unit 112 ends the operation illustrated in FIG. 2.

In step S16, the first control unit 112 outputs the data to be evicted to the second cache 120. Next, in step S18, the first control unit 112 invalidates the data area from which data is evicted. At this time, the first control unit 112 may set the rewrite flag corresponding to the data area from which data is evicted to a non-rewrite state. The first control unit 112 ends the operation illustrated in FIG. 2.

Figure 3:
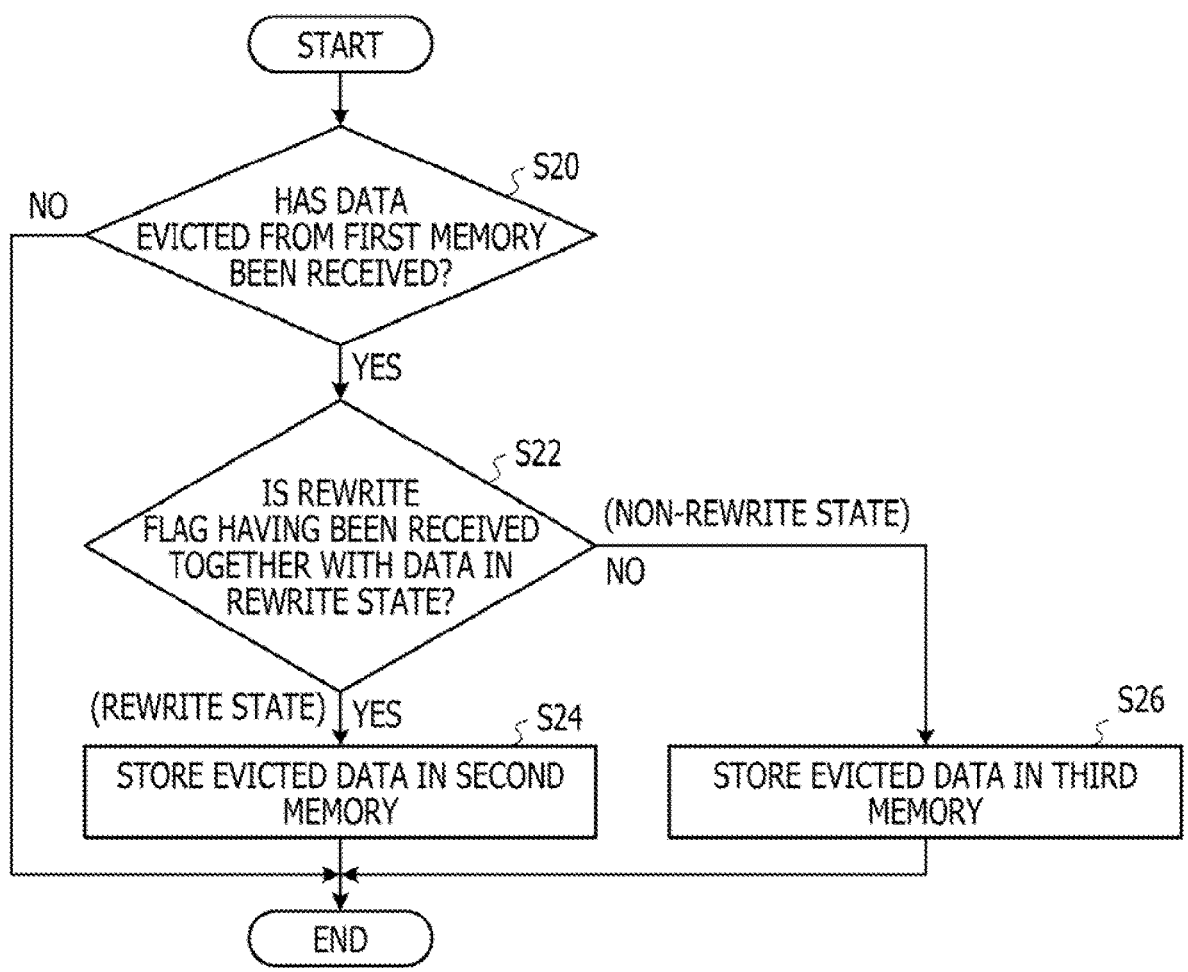
FIG. 3 is a flow diagram illustrating an example of the operation of a second cache in FIG. 1.

FIG. 3 illustrates an example of the operation of the second cache 120 in FIG. 1. For example, the flow illustrated in FIG. 3 may be executed at the time when data evicted from the first cache 110 is received, or may be executed at a predetermined frequency.

First, in step S20, the second control unit 122 determines whether data evicted from the first cache 110 has been received. When the data evicted from the first cache 110 has been received, the second control unit 122 executes step S22. When the data evicted from the first cache 110 has not been received, the second control unit 122 ends the operation illustrated in FIG. 3.

In step S22, the second control unit 122 determines whether the rewrite flag 114 having been received together with the data is in a rewrite state. When in a rewrite state, the second control unit 122 executes step S24. When in a non-rewrite state, the second control unit 122 executes step S26.

In step S24, the second control unit 122 stores the data having been received from the first cache 110 in the second memory 124, and ends the operation illustrated in FIG. 3. In step S26, the second control unit 122 stores the data having been received from the first cache 110 in the third memory 126, and ends the operation illustrated in FIG. 3.

In step S24, when there is no free space in the second memory 124, the second control unit 122 executes eviction processing of evicting data held in the second memory 124 to a subordinate cache or the main memory before storing the received data. Similarly, in step S26, when there is no free space in the third memory 126, the second control unit 122 executes eviction processing of evicting data held in the third memory 126 to a subordinate cache or the main memory before storing the received data.

As described above, in this embodiment, the circuit size (chip size) of the semiconductor device 100 may be reduced by determining the write destination of data evicted from the first cache 110 according to the rewrite flag 114 indicating the rewrite frequency. The second cache 120 may write data with a high rewrite frequency to the second memory 124 having a high writing speed and may write data with a low rewrite frequency to the third memory 126 having a low writing speed, according to the bit value of the rewrite flag 114. As a result, the access efficiency of the second cache 120 including the second memory 124 and the third memory 126 with different writing speeds may be improved while suppressing an increase in the circuit size.

The first control unit 112 may monitor the rewrite frequency of data by rewriting data and setting the rewrite flag 114 to a rewrite state based on reception of a write request from the arithmetic unit.

Figure 4:
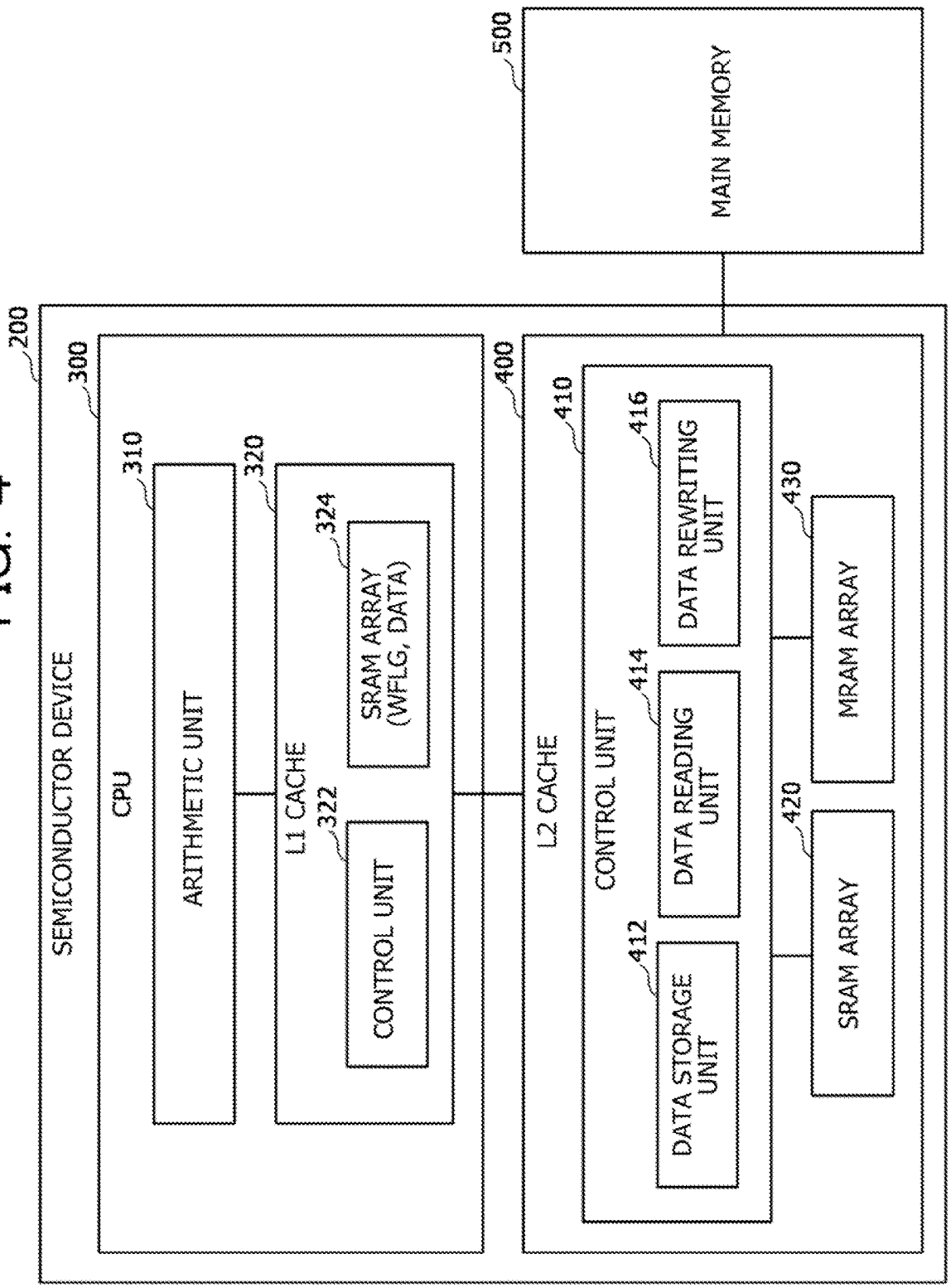
FIG. 4 is a block diagram illustrating an example of a semiconductor device according to another embodiment.

FIG. 4 illustrates an example of a semiconductor device according to another embodiment. Elements similar to those of the above-described embodiment are denoted by the same reference signs and detailed description thereof will be omitted. For example, a semiconductor device 200 illustrated in FIG. 3 is a processor such as a CPU. The semiconductor device 200 includes a CPU 300 and an L2 cache 400. The configuration, function, and operation of the semiconductor device 200 illustrated in FIG. 4 and subsequent drawings may be applied to the semiconductor device 100 illustrated in FIG. 1.

The CPU 300 includes an arithmetic unit 310 and an L1 cache 320 including a control unit 322 and an SRAM array 324. The L2 cache 400 includes a control unit 410 including a data storage unit 412, a data reading unit 414, and a data rewriting unit 416, an SRAM array 420, and an MRAM array 430. The L2 cache 400 is connected to a main memory 500. The L2 cache 400 may be connected to the main memory 500 via a subordinate cache such as an L3 cache.

The L1 cache 320 is an example of a first cache, and the L2 cache 400 is an example of a second cache. The SRAM array 324 is an example of a first memory, the SRAM array 420 is an example of a second memory, and the MRAM array 430 is an example of a third memory. The SRAM array 324 includes rewrite flags WFLG and a plurality of data areas for holding data.

For example, the writing speed and the reading speed of the SRAM array 420 are higher than those of the MRAM array 430. The memory cell area size of the SRAM array 420 is larger than that of the MRAM array 430. Instead of the MRAM array 430, a different memory array having a smaller memory cell area size and a lower writing speed than those of the SRAM array 420 may be installed.

For example, the arithmetic unit 310 includes a plurality of arithmetic elements that execute an arithmetic operation based on an arithmetic instruction and an address generator that generates a memory access address based on a load instruction and a store instruction. The arithmetic unit 310 issues a read request to the L1 cache 320 based on a load instruction, and issues a write request to the L1 cache 320 based on a store instruction.

The control unit 322 determines a cache hit or a cache miss of the L1 cache 320 based on an address included in a write request or a read request from the arithmetic unit 310.

When a cache hit is determined, the control unit 322 that has received a write request stores the data included in the write request in the SRAM array 324 and sets the rewrite flag WFLG to a rewrite state. When a cache hit is determined, the control unit 322 that has received a read request reads data to be read from the SRAM array 324 and responds to the arithmetic unit 310 with the data.

When a cache miss is determined, the control unit 322 that has received a write request issues the write request to the L2 cache 400. When notification of write completion has been received from the L2 cache 400, the control unit 322 ends the write request processing. When notification of write completion has not been received from the L2 cache 400 and data held in the target address of the write request has been received from the main memory 500, the control unit 322 stores the received data in the SRAM array 324. The control unit 322 rewrites data stored in the SRAM array 324 with the data included in the write request, and sets the rewrite flag WFLG to a rewrite state.

When a cache miss is determined, the control unit 322 that has received a read request issues the read request to the L2 cache 400. Data transferred from the L2 cache 400 or the main memory 500 is stored in the SRAM array 324, and the rewrite flag WFLG is set to a non-rewrite state.

There is a case where there is no data area in the SRAM array 324 for storing data to be received based on a read request issued to the L2 cache 400. In this case, the control unit 322 evicts data held in the SRAM array 324 to the L2 cache 400 together with the rewrite flag WFLG.

In the L2 cache 400, when the data evicted from the L1 cache 320 and the rewrite flag WFLG in a rewrite state have been received, the data storage unit 412 stores the received data in the SRAM array 420. When the data evicted from the L1 cache 320 and the rewrite flag WFLG in a non-rewrite state have been received, the data storage unit 412 stores the received data in the MRAM array 430.

When a read request has been received from the L1 cache 320, the data reading unit 414 determines a cache hit or a cache miss in the SRAM array 420 and the MRAM array 430. When a cache hit is determined, the data reading unit 414 reads the target data of the read request from the SRAM array 420 or the MRAM array 430, and outputs the read data to the L1 cache 320. When a cache miss is determined, the data reading unit 414 issues a read request to the main memory 500. Data read from the main memory 500 based on the read request is directly transferred to the L1 cache 320 without passing through the L2 cache 400.

The CPU 300 and the L2 cache 400 may each have a chip form. The semiconductor device 200 may be realized by stacking the CPU chip and the L2 cache chip on each other. A cache system similar to that in FIG. 4 may be constructed by an L2 cache that includes the SRAM array 420 including the rewrite flag WFLG and an L3 cache that includes the SRAM array 420 and the MRAM array 430.

Figure 5:
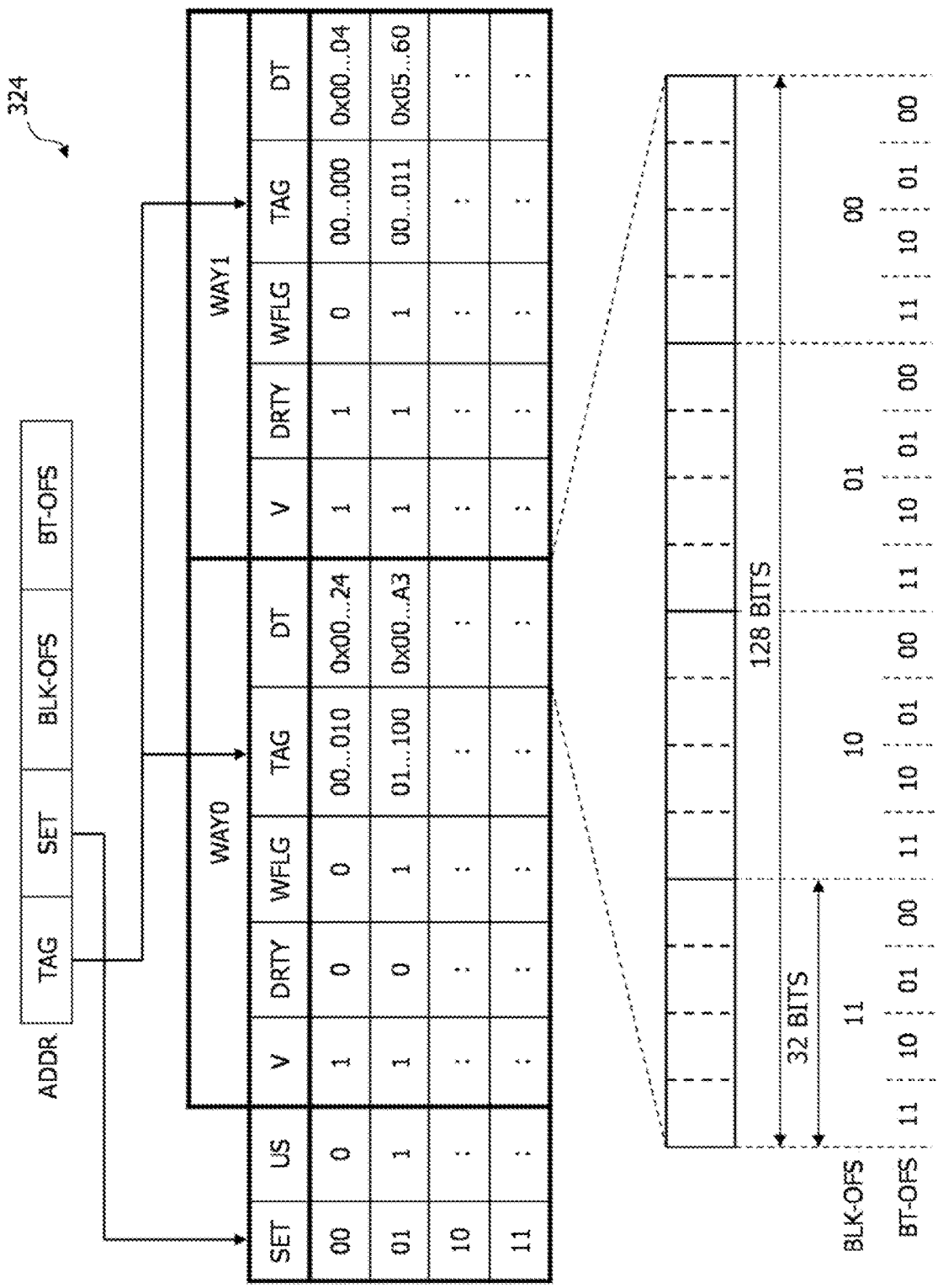
FIG. 5 is an explanatory diagram illustrating an example of an SRAM array of an L1 cache in FIG. 4.

FIG. 5 illustrates an example of the SRAM array 324 of the L1 cache 320 in FIG. 4. The first memory 116 in FIG. 1 may also have a configuration similar to that in FIG. 5. The SRAM array 324 includes two ways WAY (WAY0 and WAY1) each including four entries. Each entry of the ways WAY0 and WAY1 includes areas for valid flag V, dirty flag DRTY, and rewrite flag WFLG, an area TAG in which a tag value that is a part of an address ADDR is stored, and an area DT in which data is stored. For example, the number of ways WAY included in the SRAM array 324 may be four.

When data stored in an entry is valid, "1" is set for valid flag V. When the data is invalid, "0" is set for valid flag V. When data is transferred from the main memory 500, "0" is set for dirty flag DRTY. When data is rewritten, "1" is set for dirty flag DRTY. "1" set for dirty flag DRTY is changed to "0" when data is written back in response to a write-back request from the L2 cache 400 or the main memory 500 and is in a so-called shared state. For example, a write-back request is issued when the target data of a read request from another CPU 300 is updated in the SRAM array 324.

When data is transferred from the main memory 500, "0" is set for rewrite flag WFLG. When data is rewritten in response to a write request, "1" is set for rewrite flag WFLG. Once "1" is set for rewrite flag WFLG, it is never returned to "0". Accordingly, even when "1" set for dirty flag DRTY is returned to "0" by write-back of data, "1" set for rewrite flag WFLG may be maintained, and a rewrite history of data may be held without being erased. A value corresponding to a tag value TAG in an address ADDR is stored in the area for tag value TAG.

Although not particularly limited, in this embodiment, it is assumed that data held in the data area DT is 128 bits (16 bytes) for easy understanding of the description. Actually, for example, data held in the data area DT may be 64 bytes to 512 bytes (power of two). The size of data is equal to the size of data input to and output from the main memory 500, and is a so-called cache line size.

The SRAM array 324 includes an area for identifying a set value SET (index) and an area in which use information US indicating the number of a recently used way WAY is stored. Set value SET and use information US are provided in common for the ways WAY0 and WAY1. Since set value SET is used to identify four entries in the SRAM array 324, a set value SET is represented by two bits. For example, in a case where the SRAM array 324 includes 64 entries, a set value SET is represented by six bits. Since a set value SET is a number for identifying an entry, the SRAM array 420 does not have to include an area of set value SET.

An address ADDR included in a write request or a read request issued from the arithmetic unit 310 includes a tag value TAG, a set value SET, a block offset BLK-OFS, and a byte offset BT-OFS. For example, in a case where 128 bits of data is divided into four blocks (32 bits each), a block offset BLK-OFS is represented by two bits. In the case where one block is 32 bits, a byte offset BT-OFS is represented by two bits.

When a tag value TAG stored in an entry corresponding to a set value SET of an address ADDR included in a write request or a read request matches a tag value TAG included in the address ADDR, the control unit 322 determines a cache hit. When any tag values TAG stored in entries corresponding to a set value SET of an address ADDR do not match a tag value TAG included in the address ADDR, the control unit 322 determines a cache miss.

FIG. 6 illustrates an example of the SRAM array 420 and the MRAM array 430 of the L2 cache 400 in FIG. 4. Detailed description will be omitted for elements similar to those of the SRAM array 324 in FIG. 5. The second memory 124 and the third memory 126 in FIG. 1 may also have a configuration similar to that in FIG. 6. Each of the SRAM array 420 and the MRAM array 430 includes two ways WAY (WAY0 and WAY1) each including four entries. For example, the number of ways WAY included in each of the SRAM array 420 and the MRAM array 430 may be four or eight. Any one of the SRAM array 420 and the MRAM array 430 may include a plurality of ways WAY.

An entry of each way WAY includes areas for valid flag V and dirty flag DRTY, an area TAG in which a tag value is stored, and an area DT in which data is stored. For example, the structure of the ways WAY of the SRAM array 420 and the MRAM array 430 is similar to the structure of the ways WAY of the SRAM array 324 of the L1 cache 320, except that the ways WAY of the SRAM array 420 and the MRAM array 430 do not include rewrite flag WFLG.

As is the case with the SRAM array 324 in FIG. 5, each of the SRAM array 420 and the MRAM array 430 includes an area in which use information US is stored. The L2 cache 400 includes an area of set value SET used in common for the SRAM array 420 and the MRAM array 430. For example, in a case where the SRAM array 420 and the MRAM array 430 each include 2048 entries, a set value SET is represented by 11 bits.

By using set value SET in common, control of the L2 cache 400 by the data storage unit 412 and the data reading unit 414 may be facilitated as compared with a case where set value SET is managed for each of the SRAM array 420 and the MRAM array 430. Accordingly, the circuit size of the data storage unit 412 and the data reading unit 414 may be reduced.

Each entry of the ways WAY0 and WAY1 of the SRAM array 420 and the MRAM array 430 includes areas for valid flag V and dirty flag DRTY, an area in which a tag value TAG is stored, and an area in which data DT is stored. The value of valid flag V, the value of dirty flag DRTY, and the tag value TAG stored in each way WAY of the SRAM array 420 and the MRAM array 430 are used in a way similar to the way of using each piece of information stored in the SRAM array 324 in FIG. 5.

With the configuration of ways WAY illustrated in FIG. 6, the SRAM array 420 and the MRAM array 430 may function as one memory array (a 4-way set associative cache in the example of FIG. 6) when reading data. When writing data, each of the SRAM array 420 and the MRAM array 430 may function as a 2-way set associative cache.

Figure 7:
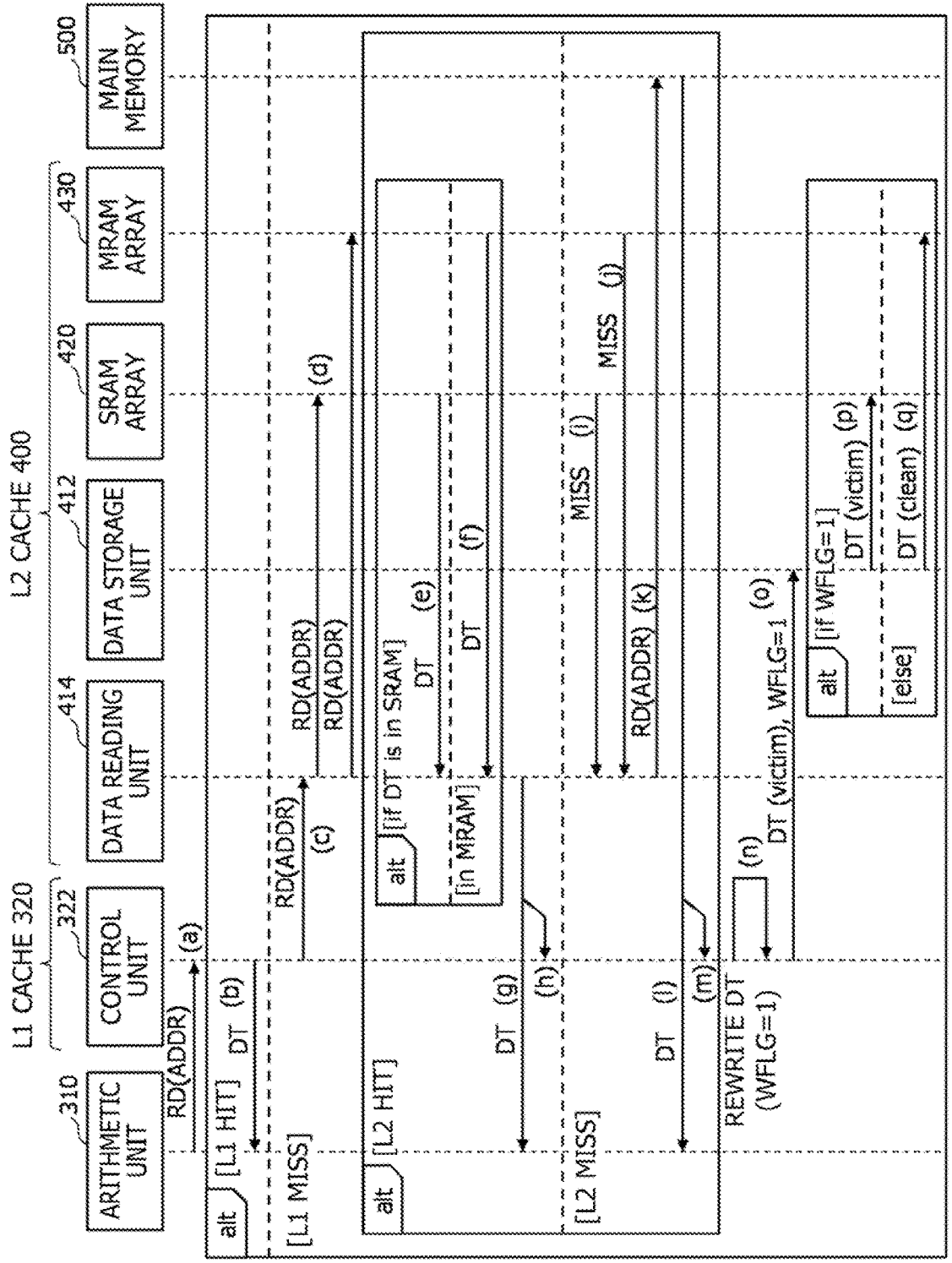
FIG. 7 is a sequence diagram illustrating an example of the operation of the semiconductor device in FIG. 4.

FIG. 7 illustrates an example of the operation of the semiconductor device 200 in FIG. 4. For example, FIG. 7 illustrates an example of a method for controlling the semiconductor device 200. FIG. 7 illustrates an example of the operation performed in a case where a read request RD is issued from the arithmetic unit 310. In the sequence diagram of FIG. 7, reference sign alt indicates conditional branching processing. The semiconductor device 100 in FIG. 1 may operate in a manner similar to FIG. 7.

The control unit 322 of the L1 cache 320 determines a cache hit or a cache miss of the L1 cache 320 based on the address ADDR included in the read request RD ((a) in FIG. 7). When a cache hit is determined (L1 hit), the control unit 322 outputs data DT held in the SRAM array 324 to the arithmetic unit 310 ((b) in FIG. 7). When a cache miss is determined, the control unit 322 outputs the read request RD including the address ADDR to the data reading unit 414 of the L2 cache 400 ((c) in FIG. 7).

The data reading unit 414 outputs the received address ADDR to each of the SRAM array 420 and the MRAM array 430, and causes the SRAM array 420 and the MRAM array 430 to determine a cache hit or a cache miss ((d) in FIG. 7). When a cache hit is determined (L2 hit), the SRAM array 420 outputs the data DT to be read, which is held in the SRAM array 420, to the data reading unit 414 ((e) in FIG. 7). When a cache hit is determined (L2 hit), the MRAM array 430 outputs the data DT to be read, which is held in the MRAM array 430, to the data reading unit 414 ((f) in FIG. 7).

The data reading unit 414 outputs the data DT received from the SRAM array 420 or the MRAM array 430 to the arithmetic unit 310 ((g) in FIG. 7). The data DT is also transferred to the control unit 322 and stored in the SRAM array 324 of the L1 cache 320 ((h) in FIG. 7).

By contrast, when a cache miss is determined (L2 miss), the SRAM array 420 outputs miss information MISS indicating a cache miss to the data reading unit 414 ((i) in FIG. 7). Similarly, when a cache miss is determined (L2 miss), the MRAM array 430 outputs miss information MISS to the data reading unit 414 ((j) in FIG. 7).

When miss information MISS has been received from both of the SRAM array 420 and the MRAM array 430, the data reading unit 414 outputs the read request RD including the address ADDR to the main memory 500 ((k) in FIG. 7). The main memory 500 outputs the held data DT to be read to the arithmetic unit 310 ((l) in FIG. 7). The data DT is also transferred to the control unit 322 and stored in the SRAM array 324 of the L1 cache 320 ((m) in FIG. 7). After that, a write request from the arithmetic unit 310 (not illustrated) causes a cache hit in the L1 cache 320, and data held in the SRAM array 324 of the L1 cache 320 is rewritten and "1" is set for rewrite flag WFLG ((n) in FIG. 7).

When there is no free entry for storing data output from the main memory 500, the control unit 322 evicts the data DT (victim) rewritten in (n) in FIG. 7 to the L2 cache 400 together with the rewrite flag WFLG (="1") ((o) in FIG. 7). Since "1" is set for rewrite flag WFLG, the data storage unit 412 stores the received data DT (victim) in the SRAM array 420 ((p) in FIG. 7).

In a case where the control unit 322 evicts data DT (clean), which is not rewritten, to the L2 cache 400 together with the rewrite flag WFLG (="0"), the data storage unit 412 stores the received data DT (clean) in the MRAM array 430 ((q) in FIG. 7).

Figure 8:
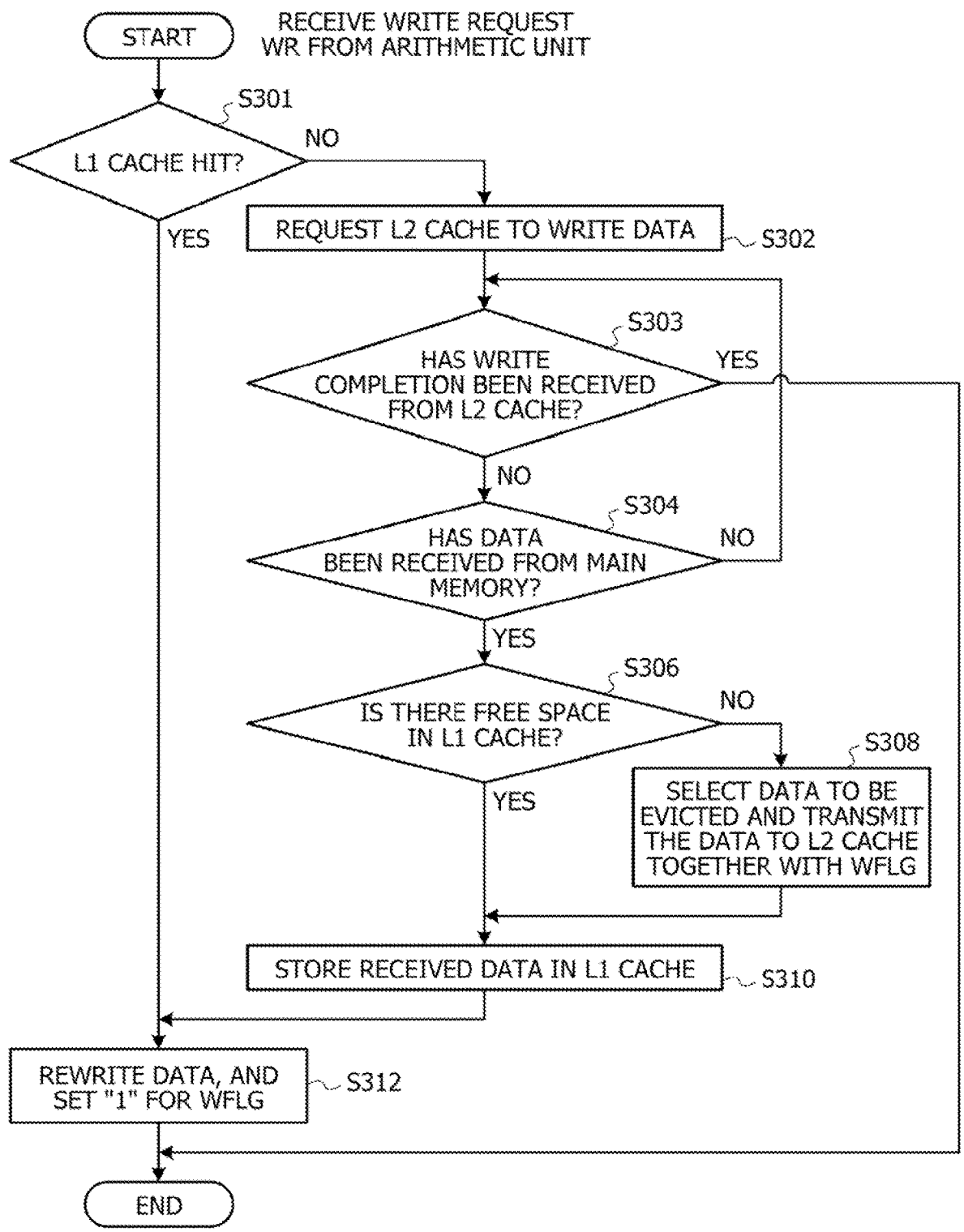
FIG. 8 is a flow diagram illustrating an example of the operation performed when the L1 cache in FIG. 4 has received a write request.

FIG. 8 illustrates an example of the operation performed when the L1 cache 320 in FIG. 4 has received a write request WR. The flow illustrated in FIG. 8 is started based on reception of a write request WR from the arithmetic unit 310. The first cache 110 in FIG. 1 may operate in a manner similar to FIG. 8.

First, in step S300, the control unit 322 of the L1 cache 320 determines a cache hit or a cache miss of the L1 cache 320 based on the address ADDR included in the write request WR. When a cache hit is determined, the control unit 322 executes step S312. When a cache miss is determined, the control unit 322 executes step S302.

In step S302, the control unit 322 requests the L2 cache 400 for data DT corresponding to the write request WR. Next, in steps S303 and S304, the control unit 322 waits for notification of write completion from the L2 cache 400 or reception of data from the main memory 500. When the notification of write completion has been received in step S303, the control unit 322 ends the processing illustrated in FIG. 8. When data has been received from the main memory 500 in step S304, the control unit 322 executes step S306.

In step S306, the control unit 322 determines whether there is a free entry in the SRAM array 324 of the L1 cache 320. When there is a free entry, the control unit 322 executes step S310. When there is no free entry, the control unit 322 executes step S308.

In step S308, the control unit 322 frees any one of the entries by selecting data to be evicted from the SRAM array 324 and transmitting the data to the L2 cache 400 together with the rewrite flag WFLG. In step S310, the control unit 322 stores the data DT having been received from the main memory 500 in a free entry (cache in). After that, the control unit 322 executes step S312.

In step S312, the control unit 322 rewrites the data DT having been stored in step S310 with the data DT having been received from the arithmetic unit 310 together with the write request WR, and sets "1" for rewrite flag WFLG of the entry in which the data DT is rewritten. The control unit 322 ends the operation illustrated in FIG. 8. At this time, "1" is also set for dirty flag DRTY. By setting "1" for rewrite flag WFLG when data is stored in the L1 cache 320 in response to a write request from the arithmetic unit 310, an increase in the circuit size of the control unit 322 may be suppressed, and the rewrite frequency may be stored for each piece of data. For example, in the L1 cache 320 of which cache capacity is smaller than those of other caches and in which data stays for a shorter time than in other caches, the rewrite flag WFLG of one bit may accurately represent the rewrite frequency of data.

Figure 9:
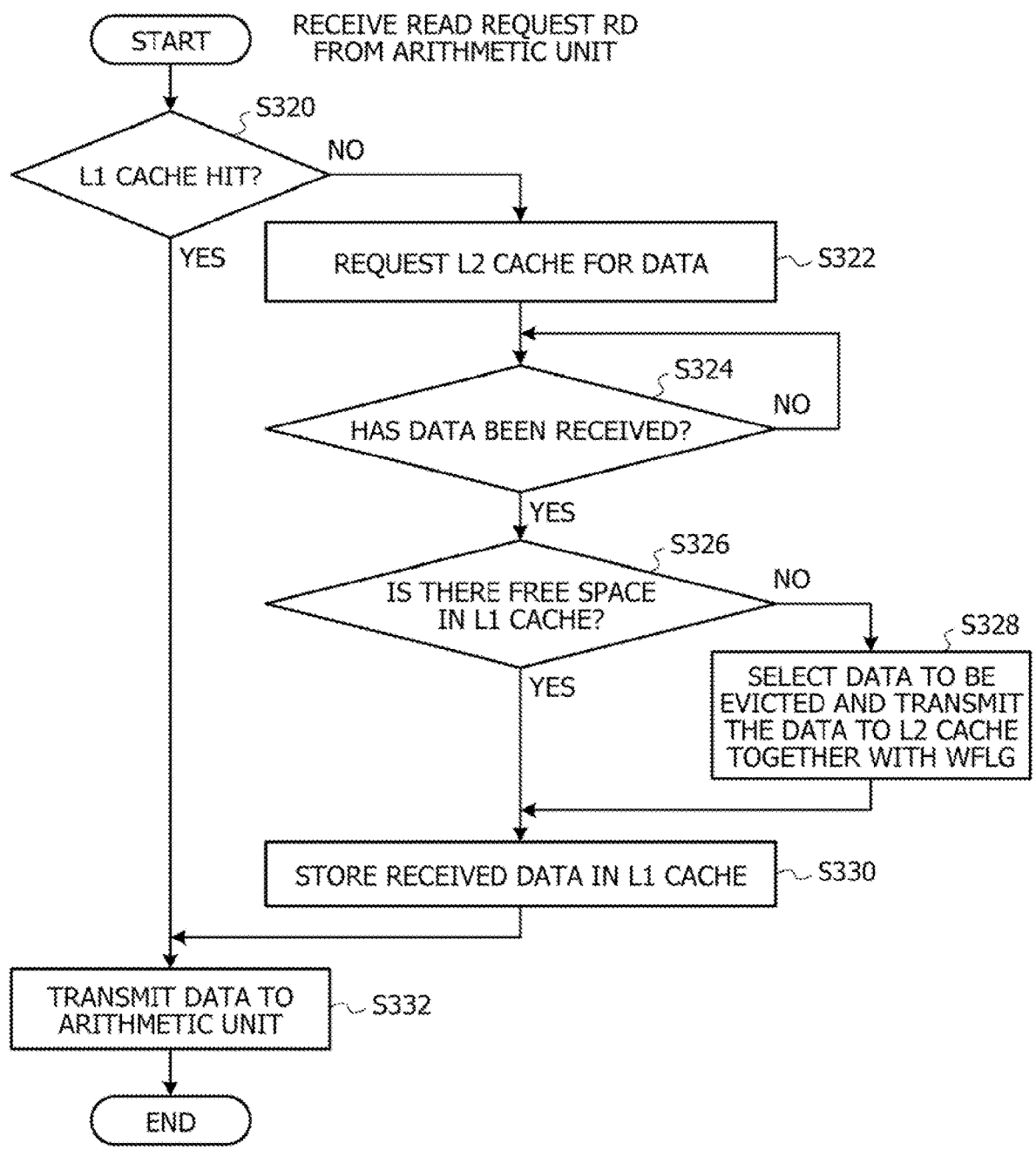
FIG. 9 is a flow diagram illustrating an example of the operation performed when the L1 cache in FIG. 4 has received a read request.

FIG. 9 illustrates an example of the operation performed when the L1 cache 320 in FIG. 4 has received a read request RD. The flow illustrated in FIG. 9 is started based on reception of a read request RD from the arithmetic unit 310. Detailed description will be omitted for the operation similar to that in FIG. 8. The first cache 110 in FIG. 1 may operate in a manner similar to FIG. 9.

First, in step S320, the control unit 322 of the L1 cache 320 determines a cache hit or a cache miss of the L1 cache 320 based on the address ADDR included in the read request RD. When a cache hit is determined, the control unit 322 executes step S332. When a cache miss is determined, the control unit 322 executes step S322.

In step S322, the control unit 322 requests the L2 cache 400 for data DT corresponding to the read request RD. Next, in step S324, the control unit 322 waits for the data from the L2 cache 400, and executes step S326 when the data has been received.

The operation of step S326 is similar to the operation of step S306 in FIG. 8, and the operation of step S328 is similar to the operation of step S308 in FIG. 8. After step S326 or step S328, in step S330, the control unit 322 stores the data DT having been received from the L2 cache 400 in a free entry (cache in). After that, the control unit 322 executes step S332. In step S332, the control unit 322 transmits the target data DT of the read request RD to the arithmetic unit 310, and ends the operation illustrated in FIG. 9.

Figure 10:
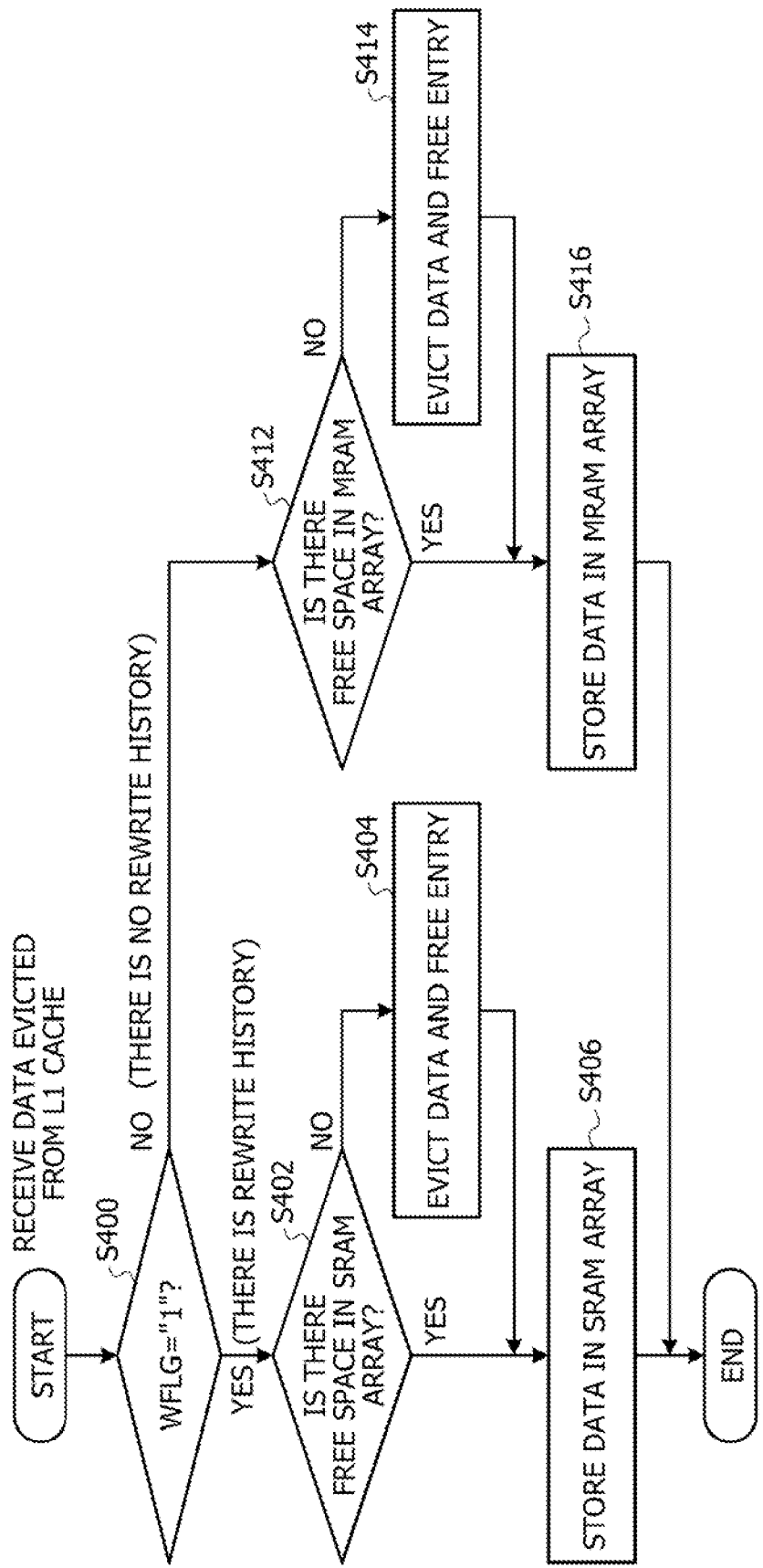
FIG. 10 is a flow diagram illustrating an example of the operation of a data storage unit of the L2 cache in FIG. 4.

FIG. 10 illustrates an example of the operation of the data storage unit 412 of the L2 cache 400 in FIG. 4. The operation illustrated in FIG. 10 is started based on reception of data evicted from the L1 cache 320 by the data storage unit 412. The second cache 120 in FIG. 1 may operate in a manner similar to FIG. 10.

First, in step S400, the data storage unit 412 determines whether the rewrite flag WFLG that has been received from the L1 cache 320 together with the evicted data is "1". When "1" is set for rewrite flag WFLG, the data storage unit 412 executes step S402 since there is a rewrite history. When "0" is set for rewrite flag WFLG, the data storage unit 412 executes step S412 since there is no rewrite history.

In step S402, the data storage unit 412 determines whether there is a free entry (free way WAY) in the SRAM array 420 of the L2 cache 400. When there is a free entry, the data storage unit 412 executes step S406. When there is no free entry, the data storage unit 412 executes step S404.

In step S404, the data storage unit 412 evicts any one of the pieces of data held in the SRAM array 420 to the main memory 500, and frees an entry. After that, the data storage unit 412 executes step S406. In step S406, the data storage unit 412 stores the data evicted from the L1 cache 320 in the free entry of the SRAM array 420, and ends the operation illustrated in FIG. 10.

On the other hand, in step S412, the data storage unit 412 determines whether there is a free entry (free way WAY) in the MRAM array 430 of the L2 cache 400. When there is a free entry, the data storage unit 412 executes step S416. When there is no free entry, the data storage unit 412 executes step S414.

In step S414, the data storage unit 412 evicts any one of the pieces of data held in the MRAM array 430 to the main memory 500, and frees an entry. After that, the data storage unit 412 executes step S416. In step S416, the data storage unit 412 stores the data evicted from the L1 cache 320 in the free entry of the MRAM array 430, and ends the operation illustrated in FIG. 10.

Figure 11:
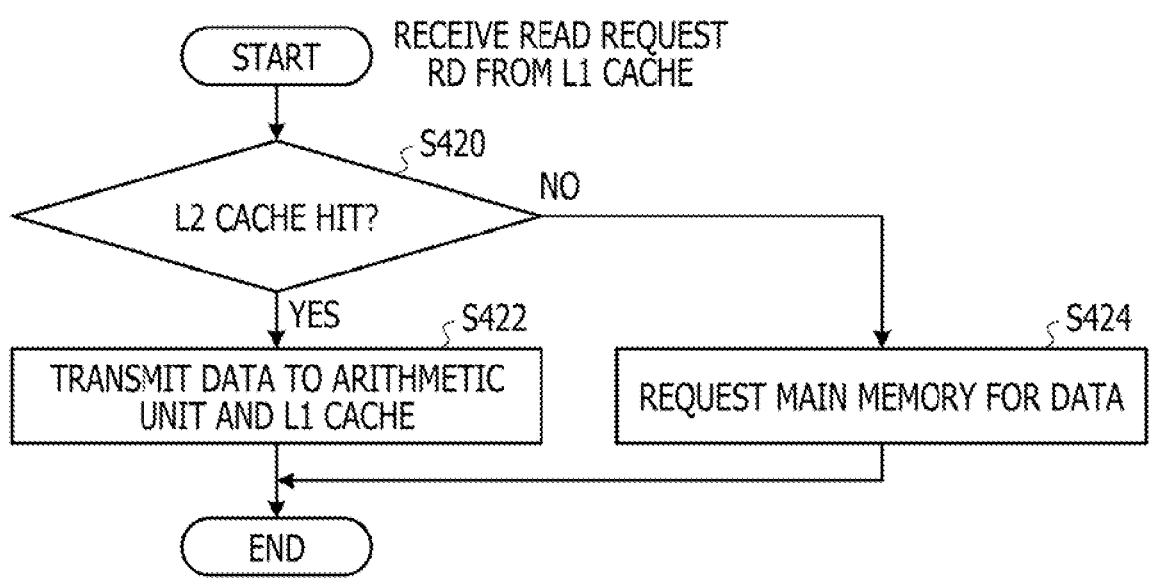
FIG. 11 is a flow diagram illustrating an example of the operation of a data reading unit of the L2 cache in FIG. 4.

FIG. 11 illustrates an example of the operation of the data reading unit 414 of the L2 cache 400 in FIG. 4. The operation illustrated in FIG. 11 is started based on reception of a read request RD from the L1 cache 320 by the data reading unit 414. The second cache 120 in FIG. 1 may operate in a manner similar to FIG. 11.

First, in step S420, the data reading unit 414 determines a cache hit or a cache miss of the L2 cache 400 based on the address ADDR included in the read request RD. The data reading unit 414 determines a cache hit in one of the SRAM array 420 and the MRAM array 430, or a cache miss in both of the SRAM array 420 and the MRAM array 430. When a cache hit is determined in one of the SRAM array 420 and the MRAM array 430, the data reading unit 414 executes step S422. When a cache miss is determined in both of the SRAM array 420 and the MRAM array 430, the data reading unit 414 executes step S424.

In step S422, the data reading unit 414 reads the data DT to be read from the SRAM array 420 or the MRAM array 430 in which a cache hit is determined, and transmits the read data DT to the arithmetic unit 310 and the L1 cache 320. The data reading unit 414 ends the operation illustrated in FIG. 11.

In step S424, the data reading unit 414 issues a read request to the main memory 500 for requesting the data to be read, and ends the operation illustrated in FIG. 11. The data to be transferred from the main memory 500 based on the read request is directly transferred to the L1 cache 320 without passing through the L2 cache 400. For this reason, the data reading unit 414 does not execute processing of receiving data from the main memory 500.

Figure 12:
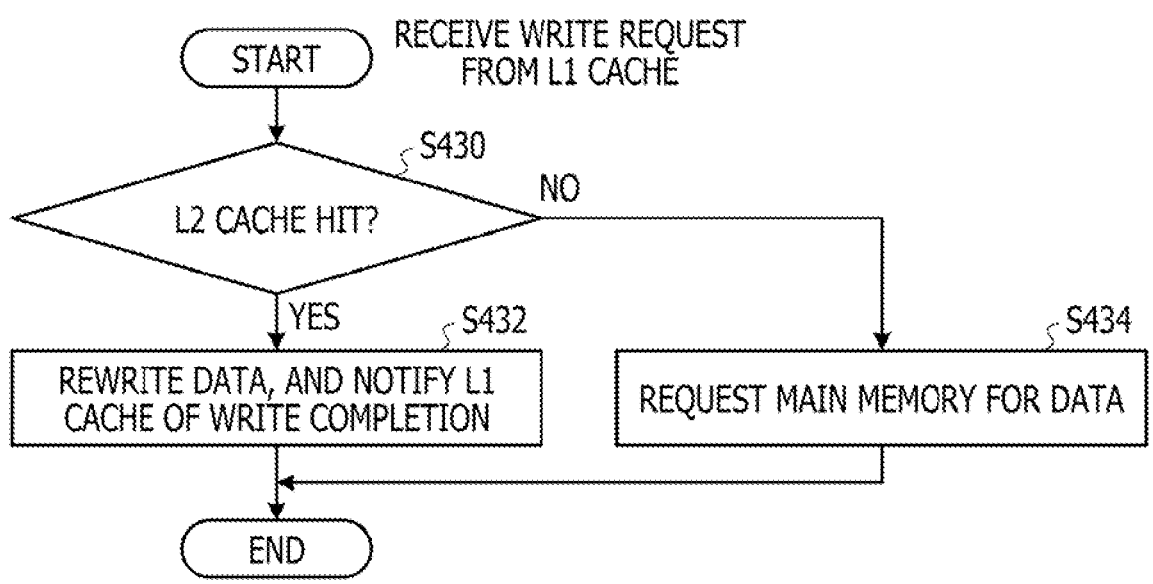
FIG. 12 is a flow diagram illustrating an example of the operation of a data rewriting unit of the L2 cache in FIG. 4.

FIG. 12 illustrates an example of the operation of the data rewriting unit 416 of the L2 cache 400 in FIG. 4. The operation illustrated in FIG. 12 is started based on reception of a write request WR from the L1 cache 320 by the data rewriting unit 416. The second cache 120 in FIG. 1 may operate in a manner similar to FIG. 12.

First, in step S430, the data rewriting unit 416 determines a cache hit or a cache miss of the L2 cache 400 based on the address ADDR included in the write request WR. The data rewriting unit 416 determines a cache hit in one of the SRAM array 420 and the MRAM array 430, or a cache miss in both of the SRAM array 420 and the MRAM array 430. When a cache hit is determined in one of the SRAM array 420 and the MRAM array 430, the data rewriting unit 416 executes step S432. When a cache miss is determined in both of the SRAM array 420 and the MRAM array 430, the data rewriting unit 416 executes step S434.

In step S432, the data rewriting unit 416 rewrites the data held in the SRAM array 420 or the MRAM array 430 in which a cache hit is determined to the target data of the write request, and notifies the L1 cache 320 of the write completion of data. The data rewriting unit 416 ends the operation illustrated in FIG. 12.

In step S434, the data rewriting unit 416 issues, to the main memory 500, a read request of data held in the target address of the write request in the main memory 500, and ends the operation illustrated in FIG. 11.

As described above, in this embodiment, effect similar to that in the above-described embodiment may be obtained. For example, data evicted from the SRAM array 324 of the L1 cache 320 may be stored in one of the SRAM array 420 and the MRAM array 430 with different writing speeds according to the rewrite frequency indicated by the rewrite flag WFLG. As a result, the access efficiency of the L2 cache 400 including the SRAM array 420 and the MRAM array 430 may be improved while suppressing an increase in the circuit size.

By providing rewrite flag WFLG in addition to dirty flag DRTY, even when "1" set for dirty flag DRTY is returned to "0" by write-back of data DT, "1" set for rewrite flag WFLG may be maintained. Accordingly, a rewrite history of data DT may be held without being erased.

By providing rewrite flag WFLG for each entry of the SRAM array 324, an increase in the size of each entry may be minimized, and the rewrite frequency of data may be held in each entry. Accordingly, even in a case where rewrite flag WFLG is provided, an increase in the circuit size of the L1 cache 320 may be suppressed.

By providing rewrite flag WFLG for each entry for each way WAY of the SRAM array 324, an increase in the circuit size of the L1 cache 320 may be suppressed while improving the cache hit efficiency of the L1 cache 320.

By using set value SET in common, control of the L2 cache 400 by the data storage unit 412 and the data reading unit 414 may be facilitated as compared with a case where set value SET is managed for each of the SRAM array 420 and the MRAM array 430. Accordingly, the circuit size of the data storage unit 412 and the data reading unit 414 may be reduced. The L2 cache 400 allocates set values SET in common for the SRAM array 420 and the MRAM array 430. Accordingly, for example, the L2 cache 400 may function as a 4-way set associative cache when reading data and may function as a 2-way set associative cache when writing data.

The features and advantages of the embodiments are apparent from the above detailed description. The scope of claims is intended to cover the features and advantages of the embodiments described above within a scope not departing from the spirit and scope of right of the claims. Any person having ordinary skill in the art may easily conceive every improvement and alteration. Accordingly, the scope of inventive embodiments is not intended to be limited to that described above and may rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
   a first cache that includes a first memory and rewrite flags that indicate whether rewriting has been performed for each piece of data held in the first memory; and
   a second cache that includes a second memory and a third memory that has a lower writing speed than the second memory, stores data evicted from the first cache in the second memory when a rewrite flag corresponding to the evicted data indicates a rewrite state, and stores data evicted from the first cache in the third memory when a rewrite flag corresponding to the evicted data indicates a non-rewrite state.

2. The semiconductor device according to claim 1, wherein, in response to a write request from a controller, the first cache stores target data of the write request in the first memory, and sets a rewrite flag corresponding to the target data to a rewrite state.

3. The semiconductor device according to claim 1, wherein the first cache
   includes, for each piece of data, a dirty flag that indicates that data held in the first memory is in a dirty state different from data held in a main memory,
   sets a corresponding rewrite flag to a rewrite state and sets a corresponding dirty flag to a dirty state when data held in the first memory is rewritten, and
   maintains a corresponding rewrite flag to a rewrite state and sets a corresponding dirty flag to a non-dirty state when data in a dirty state held in the first memory is written back to the main memory.

4. The semiconductor device according to claim 1, wherein the first cache includes a plurality of first cache lines that each hold data, and
   wherein the rewrite flags are provided for each of the first cache lines.

5. The semiconductor device according to claim 1, wherein data held in the first cache and data held in the second cache do not overlap each other.

6. The semiconductor device according to claim 1, wherein the second memory is a static random-access memory and the third memory is a magnetoresistive random-access memory.

7. A method for controlling a semiconductor device comprising:
   a first cache that includes a first memory and rewrite flags that indicate whether rewriting has been performed for each piece of data held in the first memory; and
   storing, when a rewrite flag corresponding to evicted data which is evicted from a first cache, which includes a first memory and the rewrite flag that indicates whether rewriting has been performed for each piece of data held in the first memory, indicates a rewrite state, the evicted data in a second memory by a second cache that includes the second memory and a third memory that has a lower writing speed than the second memory; and
   storing, when the rewrite flag corresponding to the evicted data indicates a non-rewrite state, the evicted data in the third memory by the second cache.

* * * * *